Feb. 23, 1926.
O. L. CHANDLER
1,573,806
LOG SAWING MACHINE
Filed August 6, 1923   4 Sheets-Sheet 1
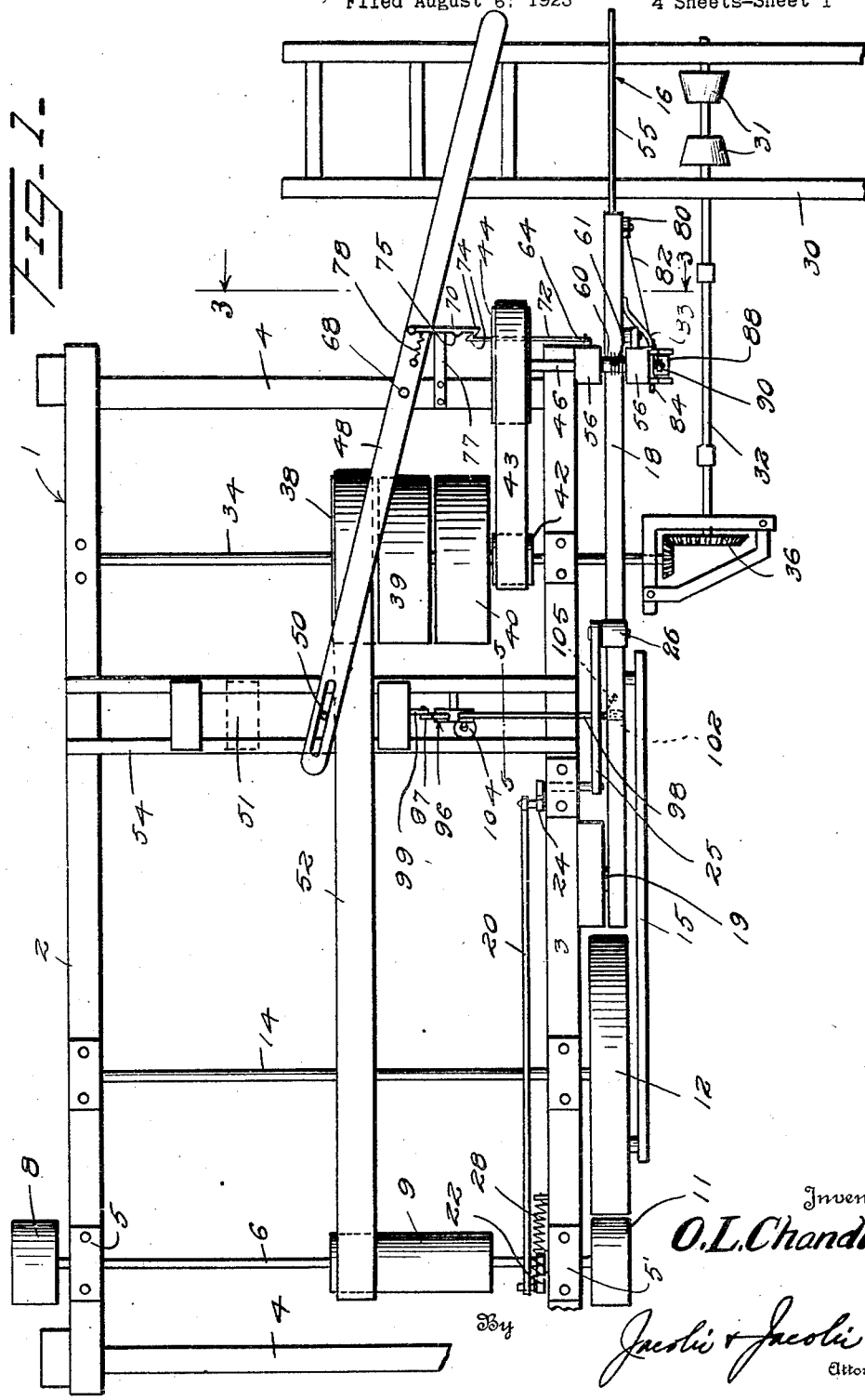
Inventor
O. L. Chandler.
By
Jacobi & Jacobi
Attorneys

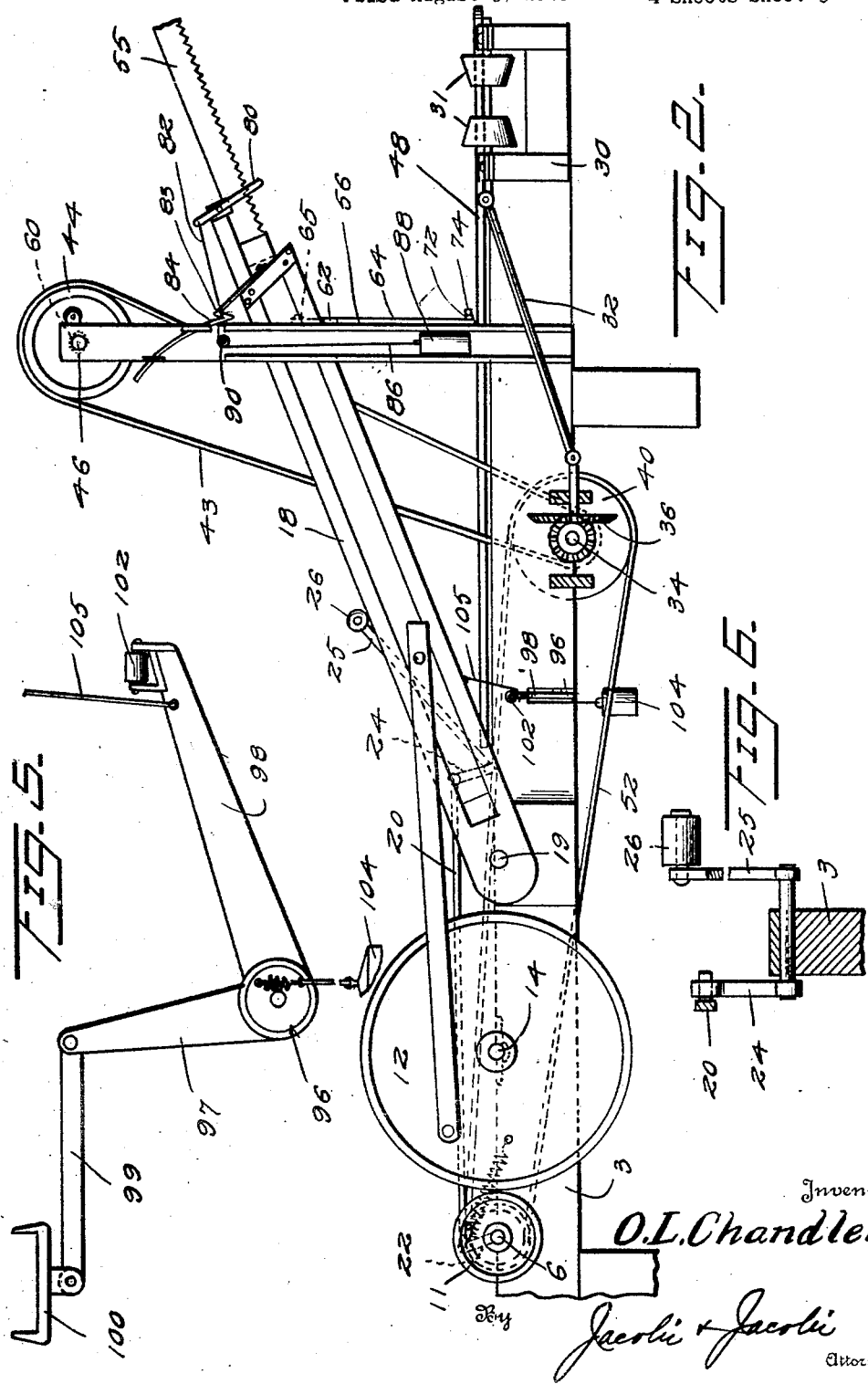

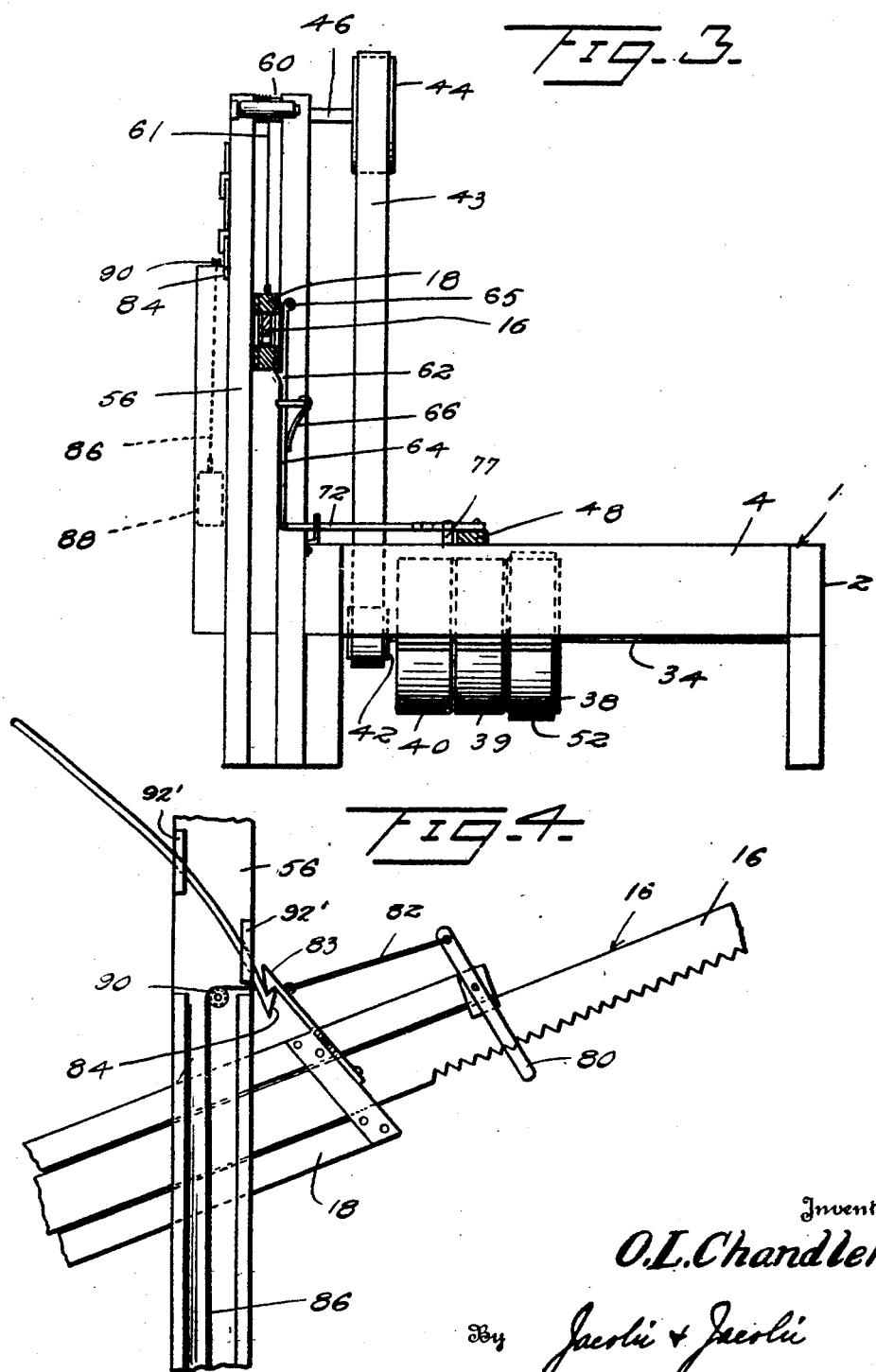

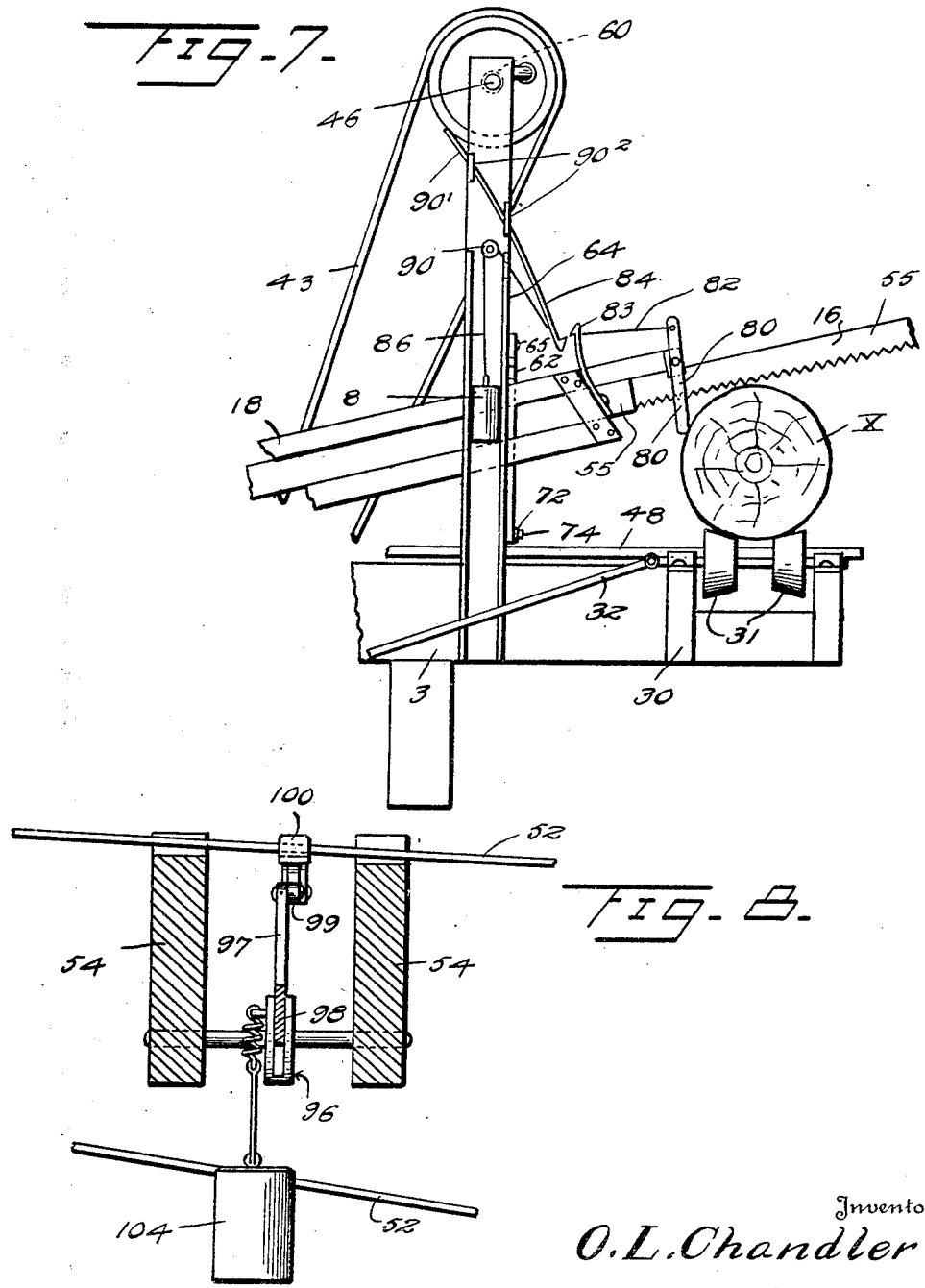

Patented Feb. 23, 1926.

1,573,806

UNITED STATES PATENT OFFICE.

ORVILLE L. CHANDLER, OF STAMFORD, NEW YORK.

LOG-SAWING MACHINE.

Application filed August 6, 1923. Serial No. 656,005.

*To all whom it may concern:*

Be it known that ORVILLE L. CHANDLER, a citizen of the United States, residing at Stamford, in the county of Delaware and State of New York, has invented certain new and useful Improvements in Log-Sawing Machines, of which the following is a specification.

This invention relates generally to the art of log sawing machines and particularly a machine which will be entirely automatic in its operation and control.

Among the numerous advantages and objects which may be observed from reference to the following description are the following:

First, a machine wherein the feeding, measuring and stopping of the log is entirely automatic; second, a machine wherein the act of feeding and positioning the log controls the discontinuance of the feed and the release of the saw so that it may descend onto the log; third; a machine having a counterbalanced saw with means controlled by the feeding of the log for removing the counterbalance; fourth, a machine having means controlled by the saw when in lowered position for returning the saw to elevated inoperative position after the log has been sawed through; fifth, a machine in which the position of the saw as regards its elevation controls the driving connection therefor; and sixth, a machine in which these various mechanisms work in conjunction as a unit.

In the accompanying drawings, Figure 1 is a top plan view of the machine;

Figure 2 is a side elevation thereof looking from the right of Figure 1;

Figure 3 is a sectional view looking in the direction of the arrows on the line 3—3 of Figure 1, Figure 4 is an enlarged side elevation of the saw, Figure 5 is an enlarged detail elevation of one of the belt shifting mechanisms and Figure 6 is an irregular and detail sectional view taken on the line 6—6 of Fig. 1.

Figure 7 is a side elevation of the forward portion of the machine, and illustrating the saw and counterbalance trip device in lower position; and Figure 8 is a vertical section taken on the line 8—8 of Fig. 1.

Referring particularly to the drawings by numerals of reference 2 designates generally the machine frame comprising longitudinal frame members 3 and transverse frame members 4. Journaled transversely of the frame at the rear portion thereof in suitable bearings 5 and 5′ is a main drive or power shaft 6, fixed on one end of which is a drum pulley 8 which may be coupled by belt to a source of power as for instance a steam or gas engine. This power shaft also carries a driving pulley 9 located between the longitudinal frame members, and which pulley 9 is of a width coextensive with three driven pulleys to be later described. The opposite end of the power shaft 6 has fixed thereon a clutch pulley 11 which is adapted under certain conditions for driving engagement with a relatively larger drum 12 which may be described as the saw drive wheel, and which latter is fixed on a shaft 14 journaled transversely of the frame. This drive wheel, through a pitmen rod 15 having a suitable form of coupling with a reciprocating drag saw 16, reciprocates the latter within a saw guide 18 pivoted at 19 on one of the longitudinal frame members. This construction permits the saw frame, and with it the saw to be swung in a vertical plane to feed the saw to its work and also retract it when the sawing operation is completed.

The clutch pulley 11 is adapted to be placed in driving relation with the wheel 12 by a clutch operating mechanism including a shiftable rod 20 connected at its rear end with a lever 22 and at its forward end with a crank 24 having rigid therewith, an arm 25 carrying an anti-friction roller 26 which normally bears upon the upper side of the saw frame guide 18, a tension spring 28 being provided which tends toward maintaining said clutch pulley in engagement with the wheel 12.

Arranged forwardly of the saw machine frame 2 and transversely thereto is a log trackway 30 including the usual type of parallel spaced rails, said trackway having journaled transversely thereof, a pair of log feeding rollers 31. These rolls are driven through shafting 32 from a driven shaft 34 journaled transversely of the machine frame 2 at the bottom thereof and at its forward portion and through bevel gearing 36.

The shaft 34 has thereon, a series of three pulleys 38, 39 and 40 respectively, the former, 38 being keyed or otherwise fixed for rotation with said shaft 34, while the latter two are loose thereon. The pulley 40 is suitably coupled to a pulley 42 of relatively smaller diameter, and loose on shaft 34, which latter through a belt 43 drives a larger pulley 44 fixed on a shaft 46 journaled at the forward end of the machine frame and at the side thereof adjacent the saw frame guide.

Pivoted upon the forward transverse frame member 4, to swing in a horizontal plane, is a belt shifting lever 48, the forward end of which extends over the delivery end of the log trackway 30 and lies in the path of the log. The rear end of the lever 48, through a pin and slot connection 50, is connected with a belt engaging shifter 51, and in operation, when the forward end of the lever is moved by the log in the direction of the arrow "A", the shifter shifts the drive belt 52 from the pulley 38 fast on shaft 34 onto the loose pulley 39. The shifter slides in guideways 54 arranged transversely of the machine frame.

The saw frame guide 18 which supports the reciprocatory cross-head 55 carrying the drag saw 55, is itself guided in its vertical movements between a pair of spaced vertical stakes 56 having journaled therein at their upper ends, the shaft 46 on which is fixed the pulley 44 driven from pulley 42 fast with pulley 40 but loose on shaft 34. The shaft 46 has fixed thereon and arranged between the stakes 56, a winding drum 60 on which is wound a cable 61 connected with the saw guide 18. For purposes of illustration, it will be assumed that the saw guide is in its uppermost position between the stakes 56, at which time, it rests upon a shoulder 62 on a vertical bar 64 pivoted at its upper end at 65 to the innermost stake 56, the bar being urged laterally by a spring 66 to normally project the shoulder toward the guide 18. Under these conditions, a log being fed along the log trackway 30 beneath the saw 16 primarily engages the forward end of the belt shifting lever 48, rocking it upon its pivot 68 and causing the belt 52 to be shifted from the driving pulley 38 to the loose pulley 39. Feeding of the log is now discontinued as the feed rolls 31 are stopped, and it rests in position beneath the saw to be cut, the saw with the saw guide however being in elevated position during the feeding operation.

During the swinging movement of the belt shifting lever 48, a pivoted detent 70 carried thereby and in releasable engagement with a rod 72 connected with the lower end of the pivoted vertical bar 64 swings said vertical bar laterally, withdrawing the shoulder 62 from beneath the saw guide and permitting it to descend and bring the saw into engagement with the log. The detent 70 and rod 72 have interengaging and separable hooked portions 74 which are disengaged after the saw guide has been released through the engagement of a lug 75 on the detent with a fixed bar 77, this engagement resulting in a swinging action of the detent against the tension of a spring 78.

The saw guide and saw having now been lowered into engagement with the log, the crank arm 25, through tension of the spring 28 is permitted to be depressed and the clutch pulley 11 brought into driving relation with the saw reciprocating wheel 12. As the saw 16, and with it, the saw guide 18 move downwardly, the lower end of the trip-lever 80 engages the upper portion of the log X, rocking said lever, and through a cable 82 causing the withdrawal of a latch 83 from engagement with a complemental latch member 84 carried on the upper end of a cable 86 having a counterweight 88, the cable 86 passing over an idle pulley 90. The latch 84 is carried at the lower end of a curved guide bar 90' slidable in guides $90^2$. Release of this weight permits the saw to descend and the full weight of the saw and guide to be placed upon the log during sawing operation.

Pivotally mounted at 92 upon the frame of the machine is a belt-shifting mechanism which includes a lever 96 in the form of a bell-crank, having arms 97 and 98, the former, through a link 99 pivotally connected at the free end thereof, operating a belt shifter 100 independent of the shifter 51 and movable in the transverse guideways 54. The opposite arm 98, extends into the space between the guideways 54 19 and thus disposed, is depressed by the weight of the saw guide 18 when the saw has cut through the log. The lever 96 when thus rocked, through the connection of the arm 97 with the belt shifting causes the belt 52 to be shifted to pulley 40 from loose pulley 39, which in turn results in the rotation of the winding drum 60 to elevate the saw guide and with it the saw. The arm 98 may be provided at its terminal with an anti-friction roller 102, while a pendent weight 104 connected to the hub of the lever above its axis permits of a quick acting movement of said lever as the weight swings to one side or other of the dead center.

When the saw frame has been elevated a predetermined distance, it overrides the shoulder 62, and through a cable connection 105 with the end of the arm 98 of the lever 96 rocks the latter in a direction opposed to that previously described and causes the shifting of the belt 52 onto the loose pulley 39. At the same time, the saw guide engaging the crank arm 25, elevates it to disengage the clutch pulley 11, the entire machine being thus thrown out of operation.

It is believed from the foregoing description, the operation of the machine will be clearly understood.

From the foregoing description of the construction of my improved apparatus, it will be seen that I have provided a simple, inexpensive and efficient means for carrying out the objects of the invention, and while I have particularly described the elements best adapted to perform the functions set forth, it is obvious that various changes in form, proportion, and in the minor details of construction may be resorted to, without departing from the spirit or sacrificing any of the principles of the invention.

What I claim as my invention and desire to protect by Letters Patent is:

1. A log sawing machine comprising in combination with the frame, driving means thereon, a saw guide, a reciprocating saw on said guide, a counterbalance for said saw guide and said saw, means for feeding a log beneath said saw, means carried by said saw guide and adapted to be engaged by the log for releasing the counterbalance, means for retaining said saw and saw guide positively in elevated position and means carried by said frame adapted to be engaged by said log during its feeding movement for initially releasing said saw and saw guide retaining means.

2. A log sawing machine comprising in combination with the frame, a driving means thereon, a reciprocatory counterbalanced saw pivoted on said frame to swing in vertical plane, saw reciprocating means, means for feeding a log beneath said saw, primary means for positively retaining said saw in elevated position, means for initially releasing said retaining means, secondary means on said frame and adapted to be engaged by a log for releasing said counterbalance whereby said saw may descend on the log, means for reciprocating said saw and means on said frame adapted to be engaged by said saw in lower position for elevating the latter to an inoperative position.

3. A log sawing machine comprising in combination with the frame, a driving mechanism thereon, a reciprocatory saw, a vertically movable pivoted guide therefor, means for reciprocating said saw, a log feeding means, a member pivoted on said frame and arranged in the path of the log and adapted to be engaged thereby, a belt shifting mechanism adapted to be operated by said pivoted member, means controlled by said belt shifting mechanism for placing said saw reciprocating mechanism in operation, a primary saw holding means for positively maintaining the saw guide and saw in elevated position, means operated by said log engaging pivoted member for releasing said primary member for releasing said primary holding means, a secondary counterbalanced saw guide and saw holding means, and log engaging means movable on said saw guide for releasing the secondary saw guide and saw holding means when said saw descends onto said log.

4. A log sawing machine comprising in combination with the frame, a driving mechanism, a reciprocatory saw, a vertically swinging guide for said saw, means for reciprocating said saw, a log feeding means, a lever pivoted on said frame and having a portion disposed in the path of the log and adapted to be engaged thereby, a belt shifting mechanism adapted to be operated by said pivoted lever, means controlled by said belt shifting mechanism for placing said saw reciprocating mechanism in operation, a primary mechanism for holding said saw guide and saw in elevated inoperative position, comprising a member having a shoulder disposed beneath said saw guide, a pivoted detent on said pivoted lever, interlocking means between said member and said detent, and means for automatically disengaging said interlocking means upon the release of said primary holding mechanism, a secondary holding means for counterbalancing the weight of the saw guide and saw, including interlocked disengageable members, one of said disengageable members being connected with a counterbalance, and a log engaging member connected with the other of said disengageable members and adapted to release said counterbalance upon contact of said second disengageable member with the log.

In testimony whereof I affix my signature.

ORVILLE L. CHANDLER.